US012783040B2

(12) United States Patent
Alameh et al.

(10) Patent No.: US 12,783,040 B2
(45) Date of Patent: Nov. 3, 2026

(54) SYSTEM AND METHOD FOR DETECTING HUMAN PRESENCE USING A CHARGE DOMAIN IMAGING DEVICE AND RANGE SENSOR FOR AN INFORMATION HANDLING SYSTEM

(71) Applicant: Dell Products LP, Round Rock, TX (US)

(72) Inventors: Rachid M. Alameh, Crystal Lake, IL (US); Jarrett Simerson, Northbrook, IL (US)

(73) Assignee: DELL PRODUCTS LP, Round Rock, TX (US)

( * ) Notice: Subject to any disclaimer, the term of this patent is extended or adjusted under 35 U.S.C. 154(b) by 81 days.

(21) Appl. No.: 19/038,297

(22) Filed: Jan. 27, 2025

(65) Prior Publication Data

US 2026/0219720 A1 Jul. 30, 2026

(51) Int. Cl.

*G06F 1/32* (2019.01)
*G06F 1/16* (2006.01)
*G06F 1/3231* (2019.01)
*G06F 3/01* (2006.01)
*G06V 40/16* (2022.01)

(52) U.S. Cl.

CPC .......... *G06F 1/3231* (2013.01); *G06F 1/1684* (2013.01); *G06F 3/013* (2013.01); *G06V 40/172* (2022.01)

(58) Field of Classification Search

CPC ...... G06F 1/3231; G06F 1/1684; G06F 3/013; G06V 40/172

See application file for complete search history.

(56) References Cited

U.S. PATENT DOCUMENTS 10,522,109 B2 * 12/2019 Mese ..................... G09G 5/003
10,635,196 B1 * 4/2020 Files ..................... G06F 1/3215
11,150,703 B2 * 10/2021 Morrison ............. G06F 1/1647
11,662,838 B1 * 5/2023 Goh ...................... G06F 3/0441 345/179
11,893,960 B1 * 2/2024 Tra ........................ G06F 1/1616
12,262,083 B2 * 3/2025 Wang ................... G11B 27/005
12,468,336 B2 * 11/2025 Wu ....................... G06F 1/1607
12,481,394 B1 * 11/2025 Huang ................ G06F 3/04166
(Continued)

*Primary Examiner* — Zahid Choudhury

(74) *Attorney, Agent, or Firm* — Prol Intellectual Property Law, PLLC; H. Kenneth Prol

(57) ABSTRACT

A system and method to detect human presence near the information handling system having a charge domain imaging device and a range sensor working in tandem when the information handling system may be in a sleep mode or awake. The range sensor detects moving presence within a first detection range from the information handling system and provide this data to the charge domain imaging device to prompt context interface operations available to a user within the first detection range. The range sensor detect moving presence within a second, closer detection range from the information handling system and provide this data to the charge domain imaging device trigger a low resolution imager at charge domain imaging device to capture images within the closer range to determine facial identification, gaze detection and other operations with those images for waking the information handling system, authorization, or for interaction with the information handling system.

20 Claims, 3 Drawing Sheets

(56) References Cited

U.S. PATENT DOCUMENTS

| | | | | |
|---|---|---|---|---|
| 2001/0029416 | A1 | 10/2001 | Breed | |
| 2002/0005778 | A1 | 1/2002 | Breed | |
| 2002/0029103 | A1 | 3/2002 | Breed | |
| 2009/0244016 | A1* | 10/2009 | Casparian | G06F 1/1692 345/173 |
| 2013/0250112 | A1 | 9/2013 | Breed | |
| 2014/0063255 | A1 | 3/2014 | Breed | |
| 2016/0109905 | A1* | 4/2016 | Morrison | G06F 1/1626 361/679.26 |
| 2016/0308276 | A1* | 10/2016 | Chang | H01Q 3/24 |
| 2017/0009435 | A1 | 1/2017 | Burns | |
| 2017/0255230 | A1* | 9/2017 | Regimbal | G06F 1/169 |
| 2020/0348745 | A1* | 11/2020 | Hamlin | G06F 3/017 |
| 2021/0298637 | A1 | 9/2021 | Vadlamudi-reddy | |
| 2021/0302563 | A1* | 9/2021 | Lemarchand | G01S 13/56 |
| 2021/0318381 | A1* | 10/2021 | Chang | G01R 31/3646 |
| 2021/0333084 | A1* | 10/2021 | Ho | G01B 7/023 |
| 2022/0123797 | A1* | 4/2022 | Files | H04B 17/16 |
| 2022/0179494 | A1* | 6/2022 | Tam | G06F 3/013 |
| 2022/0361266 | A1* | 11/2022 | Ahmed | G06F 1/1616 |
| 2023/0127758 | A1* | 4/2023 | Ramasamy | G06F 1/1616 726/26 |
| 2023/0185277 | A1* | 6/2023 | Morrison | G05B 19/4155 700/137 |
| 2023/0421884 | A1* | 12/2023 | Thornley | G06V 10/60 |
| 2024/0264953 | A1* | 8/2024 | Chu | G06F 13/10 |
| 2024/0281309 | A1* | 8/2024 | Chang | G06F 1/1615 |
| 2024/0286628 | A1 | 8/2024 | Sugiura | |
| 2024/0288917 | A1* | 8/2024 | Kacelenga | G06F 1/1677 |
| 2024/0345644 | A1 | 10/2024 | Lemarchand | |
| 2025/0125429 | A1* | 4/2025 | Files | G06F 1/1635 |
| 2025/0159300 | A1* | 5/2025 | Williams | H04N 21/4854 |
| 2026/0064183 | A1* | 3/2026 | Chang | G06F 1/1616 |
| 2026/0088235 | A1* | 3/2026 | Goh | H01H 13/023 |

* cited by examiner

SYSTEM AND METHOD FOR DETECTING HUMAN PRESENCE USING A CHARGE DOMAIN IMAGING DEVICE AND RANGE SENSOR FOR AN INFORMATION HANDLING SYSTEM

FIELD OF THE DISCLOSURE

The present disclosure generally relates to a system and method for detecting human presence near an information handling system. The present disclosure more specifically relates systems and methods for detecting human presence near an information handling system using a low power dual-senor system with a range sensor that triggers and adjusts a charge domain imaging device of user presence for interaction with the information handling system.

BACKGROUND

As the value and use of information continues to increase, individuals and businesses seek additional ways to process and store information. One option available are information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more workspace productivity applications such as for teleconferencing, word processing, sales systems, business software, gaming applications, or the like. In some embodiments, a security application may be executed at the information handling system to provide for secure access to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
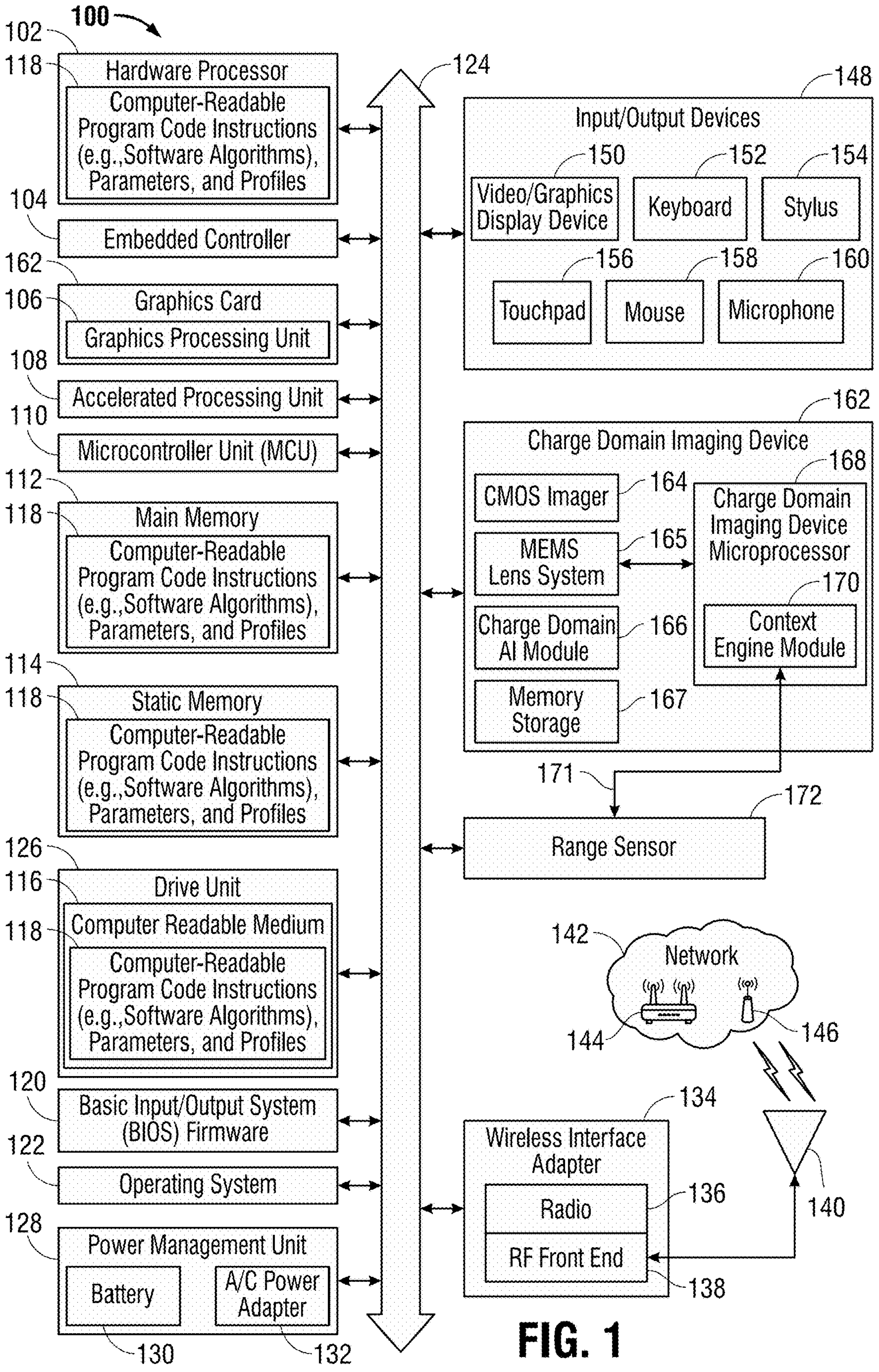
FIG. 1 is a block diagram illustrating an information handling system executing computer-readable program code instructions to detect user presence near an information handling system with a range sensor and charge domain imaging sensor according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems may implement a number and variety of sensors that may provide data to a hardware processor of the information handling system in order to provide, for example, context data. This context data may be used to determine operating conditions, environments, and functions of the information handling system in order to, for example, cause the information handling system to change operating parameters and to enable security procedures. Issues arise in the use of those sensors, however. For example, some sensors, such as a video camera device, may consume a significant amount of power even when no user is present and require execution by one or more hardware processing units or controllers on the information handling system. This results in wasted power and consumes processing at the information handling system and increasing costs of operation and wear and tear in the hardware of the information handling system. Additionally, in some instances the information handling system may be powered down or placed in a sleep mode after a predetermined period of time such that a typical webcam or other video camera is not operational. Still further, in laptop-type information handling systems, a lid of the information handling system may be closed such that a video camera is not capable of detecting a user near, approaching, or retreating away from the information handling system. This reduces the effectiveness of those proximity sensors used in the information handling system.

The present specification describes, in an embodiment, an information handling system that includes both a range sensor and a charge domain imaging device operating in tandem. The range sensor may detect presence within a first detection range from the information handling system, provide prompting output to an information handling system indicative of detected presence within the first detection range. Further, the range sensor can also detect any moving presence, such as a human presence, approaching, reaching, and within a second range level and provide prompting output indicative of detected presence within the second detection range to a charge domain imaging device. This allows the charge domain imaging device to be initiated upon receiving the prompting output indicative of detected presence reaching and within the second range level detection range to monitor for user interaction with the information handling system. The range sensor is a low power, always on range sensor, such as an ultrasound range sensor, ultrawideband UWB range sensor, RADAR range sensor, or an infrared (IR) time of flight (TOF) range sensor in some embodiments. In embodiments herein, the range sensor may be a single-pixel, low resolution range sensor requiring low power for operation but have relatively high accuracy on detection of a user presence and distance from the information handling system.

Because the range sensor operates at low power levels, this simple detection of a moving presence in a three-dimensional (3D) space may result in very low power consumption until the range sensor detects moving presence within the first detection range. In an embodiment, the first detection range is a further detection range from the information handling system. In one example embodiment, the first detection range may be from 3 feet to 15 feet from the information handling system. This allows the output from the range sensor to send a signal to the charge domain imaging device if and when moving presence is detected as approaching a second detection range that is closer to the information handling system. The second detection range may correspond to an effective operational range of the charge domain imaging device. In one example embodiment, the second detection range may be between 0 and 3 feet. In an embodiment, the range sensor can determine, at least, moving presence around the information handling system at ranges within 15 feet or some other outer range limit.

During operation, the range sensor may determine if the user is approaching or retreating from the information handling system and providing output indicating to the information handling system of a distance of the user from the information handling system. This context data may be used by the range sensor to monitor for changes in position of the detected human within, for example, a given room where the information handling system is located. Further, the range sensor may provide feedback distance context data to make adjustments, such as for focus of a lens, for the tandem charge domain imaging device in some embodiments.

Additionally, the charge domain imaging device also operates at low power because an internal embedded artificial (AI) processing block of a lower power microcontroller unit (MCU) processes the generated pixel charges without digitizing those pixel sensor charges and because the hardware processor of the information handling system is not processing the video data from the charge domain imaging device. The charge domain imaging device is a self-contained system with its own low power MCU with an embedded AI processing block, and the charge domain imaging device may not send a signal to wake the information handling system until the charge domain imaging device has detected human presence from facial recognition algorithm detecting a face or identifying user in front of or engaging with the information handling system without using wider information handling system resources. This may wake the information handling system to trigger other activation of systems including authentication of the user by various means or biometrics. For example, the low power MCU of the charge domain imaging device may utilize low resolutions directly from an array of sensors, such as 96×96 level of resolution, to capture low resolution images of a user detected by the range sensor within a closer detection range to confirm that the user is there from identification of a face or that the user is engaged based on detection of a user's gaze at the information handling system. In an alternate embodiment, a higher resolution charge domain imager, for example higher than a 96×96 resolution such as a video graphics array (VGA) sensor, may be used instead to conduct user authentication from captured images of a user without using wider information handling system resources, but such a system requires increased sensor power but will still be lower power than operation of digital cameras. This, again, reduces the amount of power consumption at the information handling system until it is determined that a user is present in front of the information handling system and interacting with the information handling system.

In an embodiment, the range sensor may be formed within a base chassis or housing of the information handling system while the charge domain imaging device formed into a top portion of a lid of the information handling system. This allows the range sensor to operate even when the lid of the laptop-type information handling system is in a closed position.

In an embodiment, the charge domain imaging device may determine facial features of the user from a low resolution images captured by a complementary metal-oxide semiconductor (CMOS) imager and a low power AI processing block of the MCU receiving the low resolution images. This AI processing block may be trained to recognize a face indicating a user is before or even engaged with the information handling system which results in the charge domain imaging device sending a wake command to the information handling system. In other embodiments, the AI processing block onboard the charge domain imaging device may be trained to recognize a facial features for determination of gaze direction indicating a user is engaged with the information handling system in a certain direction of gaze, such as among one or more display monitors, which results in the charge domain imaging device sending a gaze direction command to the information handling system that may provide for interaction input commands with the information handling system.

In an embodiment, the charge domain imaging device may include a charge domain imaging device microprocessor to execute computer-readable program code of a context engine module. The context engine module may, based on detected user interaction, provide output to the information handling system indicative of operations to be performed such as the wake signal, gaze location or direction, gesture recognition, or others to facilitate user commands such as volume control or responses to audible notifications from the information handling system (e.g., email notifications, etc.).

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 144, a base station transceiver 146, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 112, (volatile (e.g., random-access memory, etc.), or static memory 114, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU) 110, an accelerated processing unit (APU) 108, other types of hardware processing devices, or any combination thereof. It is appreciated that the information handling system 100 may include any number of hardware processing devices described herein. Computer readable code instructions stored in main memory 112 (e.g., RAM) may be accessible by hardware processing resources using that main memory 112. Computer-readable program code instructions stored in static memory 114, main memory 112, or drive unit 126 may be involved in invoking such computer-readable program code instructions to main memory 112 according to embodiments herein. Additional components of the information handling system 100 may include one or more storage devices such as static memory 114 or drive unit 126. The information handling system 100 may include or interface with one or more communications ports for communicating with external devices, as well as various wired or wireless input and output (I/O) devices 148, such as a mouse 158, a trackpad 156, a stylus 154, a keyboard 152, a video/graphics display device 150, a microphone 160, or any combination thereof. Further, various wired or wireless input and output (I/O) devices 148, such as a microphone 160, speaker 168, a trackpad 156, a stylus 154, a keyboard 152, a video/graphics display device 150, mouse 158, or any combination thereof may be integrated into the chassis of the information handling system 100 in other embodiments. Portions of an information handling system 100 may themselves be considered information handling systems 100.

Information handling system 100 may include devices or modules that embody one or more of the devices or execute instructions for one or more systems and modules. The information handling system 100 may execute computer-readable program code instructions (e.g., software algorithms) parameters, and profiles 118 that may operate on servers or systems, remote data centers, or on-box in individual client information handling systems according to various embodiments herein. In some embodiments, it is understood any or all portions of computer-readable program code instructions (e.g., software algorithms) parameters, and profiles 118 may operate on a plurality of information handling systems 100.

The information handling system 100 may include the hardware processor 102 such as a central processing unit (CPU) or other hardware processing resources (e.g., 104, 106, 108, 110). Any of the hardware processing resources may operate to execute computer readable code instructions that are either firmware or software code, such as those software systems and modules described herein. Moreover, the information handling system 100 may include memory such as main memory 112, static memory 114, and disk drive unit 126 (volatile (e.g., random-access memory, etc.), nonvolatile memory (read-only memory, flash memory etc.) or any combination thereof or other memory with computer readable medium 116 storing computer-readable program code instructions (e.g., software algorithms) parameters, and profiles 118 executable by the hardware processor 102 (e.g., central processing unit), NPU 110, APU 108, EC 104, GPU 106, or any other hardware processing device. The information handling system 100 may also include one or more buses 124 operable to transmit communications between the various hardware components such as any combination of various wired or wireless I/O devices 148 as well as between hardware processors 102, an EC 104, the operating system (OS) 122, the basic input/output system (BIOS) 120, the wireless interface adapter 134, or a radio module, among other components described herein. In an embodiment, the hardware processor 102, EC 104, GPU 106, NPU 110, APU 108, and/or others may execute one or more bus drivers in order to transmit this data between the information handling system 100 and the wired or wireless input/output devices 148 described herein. In an embodiment, the information handling system 100 may be in wired or wireless communication with the wired or wireless I/O devices 148 such as a keyboard 152, a mouse 158, video/graphics display device 150, stylus 154, trackpad 156, or microphone 160, among other peripheral devices.

As described herein, the information handling system 100 further includes a video/graphics display device 150. The video/graphics display device 150 in an embodiment may function as a liquid crystal display (LCD), an organic light emitting diode (OLED), a flat panel display, or a solid-state display. It is appreciated that the video/graphics display device 150 may be wired or wireless and may be an external video/graphics display device 150 that allows a user to increase the desktop area by extending the desktop in an embodiment. Additionally, as described herein, the information handling system 100 may include or be operatively coupled to a cursor control device (e.g., a trackpad 156, or gesture or touch screen input), a stylus 154, and/or a keyboard 152, among others that allows the user to interface with the information handling system 100 via the video/graphics display device 150. Information handling system 100 may also be operatively coupled to a wired or wireless input/output device 148 or other hardware devices that may include a hardware processing device such as a hardware processor, microcontroller, or other hardware processing resource. Various drivers and hardware control device electronics may be operatively coupled to operate the wired or wireless I/O devices 148 according to the embodiments described herein.

A network interface device of the information handling system 100 may be wired or wireless such as shown with wireless interface adapter 134 that can provide wireless connectivity among devices such as with Bluetooth® or to a network 142, e.g., a wide area network (WAN), a local area network (LAN), wireless local area network (WLAN), a wireless personal area network (WPAN), a wireless wide area network (WWAN), or other network. In embodiments described herein, the wireless interface device 134 with its radio 136, RF front end 138 and antenna 140 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 144 or base station 146 used to operatively couple the information handling system 100 to a network 142 via a wireless interface adapter 134. In a specific embodiment, the network 142 may include macro-cellular connections via one or more base stations 146 or a wireless AP 144 (e.g., Wi-Fi), or such as through licensed or unlicensed WWAN small cell base stations 146. Connectivity may be via wired or wireless connection. For example, wireless network wireless APs 144 or base stations 146 may be operatively connected to the information handling system 100. Wireless interface adapter 134 may include one or more RF (RF) subsystems (e.g., radio 136) with transmitter/receiver circuitry, modem circuitry, one or more antenna RF (RF) front end 138 circuits, one or more wireless controller circuits, amplifiers, antennas 140 and other circuitry of the radio 136 such as one or more antenna ports used for wireless communications via multiple radio access technologies (RATs). The radio 136 may communicate with one or more wireless technology protocols.

In an embodiment, the wireless interface adapter 134 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, proprietary RF protocol, or similar wireless standards may be used. Wireless interface adapter 134 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 134 can represent an add-in card, wireless network interface module that is integrated with a main board of the information handling system 100 or integrated with another wireless network interface capability, or any combination thereof.

In some embodiments, a hardware processing resource executes computer-readable program code instructions of software or firmware to implement one or more of some systems and methods described herein, or dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 118 or receives and executes computer-readable program code instructions, parameters, and profiles 118 responsive to a propagated signal, so that a hardware device connected to a network 142 may communicate voice, video, or data over the network 142. Further, the computer-readable program code instructions, parameters, and profiles 118 may be transmitted or received over the network 142 via the network interface device or wireless interface adapter 134.

The information handling system 100 may include a set of computer-readable program code instructions, parameters, and profiles 118 that may be executed to cause the computer system to perform any one or more of the methods or computer-based functions disclosed herein. For example, computer-readable program code instructions, parameters, and profiles 118 may be executed by a hardware processor 102, GPU 106, EC 104, APU 108, NPU 110, or any other hardware processing resource and may include software agents, or other aspects or components used to execute the methods and systems described herein. Various software modules comprising application computer-readable program code instructions, parameters, and profiles 118 may be coordinated by an operating system (OS) 122, and/or via an application programming interface (API) include a unified device API described herein. An example OS 122 may include Windows®, Android®, and other OS types. Example APIs may include Win 32, Core Java API, or Android APIs.

In an embodiment, the information handling system 100 may include a disk drive unit 126. The disk drive unit 126 and may include machine-readable program code instructions, parameters, and profiles 118 in which one or more sets of machine-readable program code instructions, parameters, and profiles 118 such as firmware or software can be embedded to be executed by the hardware processor 102 (e.g., CPU) or other hardware processing devices such as a GPU 106, an EC 104, an NPU 110, an APU 108, or other hardware processing resource device to perform the processes described herein. Similarly, main memory 112 and static memory 114 may also contain a computer-readable medium for storage of one or more sets of machine-readable program code instructions, parameters, or profiles 118 described herein. The disk drive unit 126 or static memory 114 also contain space for data storage. Further, the machine-readable program code instructions, parameters, and profiles 118 may embody one or more of the methods as described herein. In a particular embodiment, the machine-readable program code instructions, parameters, and profiles 118 may reside completely, or at least partially, within the main memory 112, the static memory 114, and/or within the disk drive 126 during execution by the hardware processor 102, EC 104, APU 108, NPU 100, or GPU 106 of information handling system 100.

Main memory 112 or other memory of the embodiments described herein may contain computer-readable medium (not shown), such as RAM in an example embodiment. An example of main memory 112 includes random access memory (RAM) such as static RAM (SRAM), dynamic RAM (DRAM), non-volatile RAM (NV-RAM), or the like, read only memory (ROM), another type of memory, or a combination thereof. Static memory 114 may contain computer-readable medium (not shown), such as NOR or NAND flash memory in some example embodiments. The applications and associated APIs, for example, may be stored in static memory 114 or on the disk drive unit 126 that may include access to a machine-readable code instructions, parameters, and profiles 118 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 128 (a.k.a. a power supply unit (PSU)). The PMU 128 may include a hardware controller and executable machine-readable code instructions to manage the power provided to the components of the information handling system 100 such as the hardware processor 102 and other hardware components described herein. The PMU 128 may control power to one or more components including the one or more drive units 126, the hardware processor 102 (e.g., CPU), the EC 104, the GPU 106, the APU 108, the NPU 110, a video/graphic display device 150, or other wired or wireless I/O devices 148 such as the mouse 158, the stylus 154, the keyboard 152, microphone 160, and the trackpad 156 and other components that may require power when a power button has been actuated by a user. In an embodiment, the PMU 128 may monitor power levels and power may be electrically coupled to the information handling system 100 via various ports in embodiments herein to provide this power. The PMU 128 may be coupled to the bus 124 to provide or receive data or machine-readable code instructions. The PMU 128 may regulate power from a power source such as the battery 130, or AC power adapter 132 such as from one or more ports. In an embodiment, the battery 130 may be charged via the AC power adapter 132 and provide power to the components of the information handling system 100 when AC power from the AC power adapter 132 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 116 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described herein, the information handling system 100 may include a range sensor 172. An example range sensor 172 may include a CH201 chip manufactured by TDK® or ultrawide band UWB manufactured by NXP® operating as a range sensor. This ultrasound range sensor 172 is low power, for example, may operate with 0.15 mW of power. The range sensor 172 may generally include any low power device that can detect within a certain range of the information handling system 100. In an embodiment, the range sensor 172 may include an ultrasound range sensor, an infrared range sensor, a time-of-flight (ToF) sensor, UWB sensor, a RADAR sensor, and the like that can determine, at least, moving presence around the information handling system. The low power range sensor 172 may be a single pixel range sensor, but may operate in tandem, via a data communication operative coupling 171, with a charge domain imaging device 162. In an embodiment, the data communication operative coupling 171 may be by an Universal Asynchronous Receiver/Transmitter (UART) data connection, general purpose input/output (GPIO) or other connection between the low power range sensor 172 and the charge domain imaging device 162 or with the information handling system 100. In other embodiments, the data communication operative coupling 171 may be wireless. Both the charge domain imaging device 162 and the range sensor 172 are low power, such as 0.7 mW and 0.15 mW respectively, such that they may be always-on with little power consumption from the power systems of the information handling system 100, such as when it is in sleep mode, in embodiments herein.

The charge domain imaging device 162 includes onboard AI capabilities of a charge domain AI module 166 executing on a charge domain imaging device microprocessor, such as an ARM Coretex microcontroller unit (MCU), with an embedded AI processing block in embodiments herein providing added capability to low power range sensor without using wider information handling system 100 resources. For ease of explanation, the present specification will describe the range sensor 172 as an ultrasound sensor. However, the present specification contemplates that these other types of range sensors 172, including a RADAR range sensor, an UWB range sensor, an IR TOF range sensor or others that are single pixel and low power, may be used to provide output of range distances to the charge domain imaging device 162 or the information handling system 100, such as when activated from a sleep mode. The charge domain imaging device 162 is also low power. For example, the charge domain imaging device 162 in one embodiment may operate at 0.7 mW such that both sensor systems operate at under 1 mW.

In an embodiment, the range sensor 172 may operate even while the information handling system 100 is in a sleep state with the hardware processor 102 of the information handling system 100 in a low power state. This allows power to be conserved at the information handling system 100 while the range sensor 172 is monitoring for human or other movement presence at and near the information handling system 100 and then may trigger the low power charge domain imaging device 162 to capture low resolution images within a closer detection range. In an embodiment, the range sensor 172 may determine if moving presence is within a first detection range and beyond a second, closer detection range from the information handling system. In an embodiment, this first detection range may be as far as fifteen feet, which may be similar to the size of a room where the information handling system 100 has been placed. The second, closer detection range may be within a 2-4 feet radius or the effective operational limits of the low resolution CMOS image sensor 164.

In an embodiment, the information handling system 100 may be a laptop-type information handling system 100 that includes a lid portion (e.g., an A-cover and B-cover) and a base portion (e.g., a C-cover and a D-cover). The range sensor 172 may be formed into a base portion of the laptop-type information handling system 100 such that, even if the lid of the information handling system 100 is placed in a closed position, the range sensor 172 may still detect moving presence around the information handling system 100. In an embodiment, the range sensor 172 may be formed on a forward-facing edge of the base of the laptop-type information handling system 100.

In an embodiment, based on a detected range of a human around the information handling system 100, the range sensor 172 may provide output to the charge domain imaging device 162 that effects operations at the information handling system 100 and the charge domain imaging device 162. In an example embodiment, if the range sensor 172 detects moving presence within at least one detection range, such as the second, closer detection range, of the charge domain imaging device 162 at the information handling system 100, the range sensor 172 may provide, as output, a signal to the charge domain imaging device 162 that initiates operation of the low resolution CMOS imager 164 at the charge domain imaging device 162. This initiation of capturing low resolution images at the charge domain imaging device 162 may allow the charge domain imaging device 162 to, for example, monitor for user interaction with the information handling system within this second detection range only, further preserving power consumption.

In one example embodiment, while the range sensor 172 is detecting moving presence around the information handling system 100, the charge domain imaging device 162 may be directed by the range sensor 172 to a specific location around or distance from the information handling system 100 where the moving presence is detected for the context engine module 170 executing at the charge domain imaging device 162 may adjust operation or conduct contextual functions. For example, the range sensor 172 may provide distance range data, with precision, of a user in front font of the CMOS low resolution imager. The charge domain imaging device microprocessor 168 executes a context engine module 170 to adjust a microelectromechanical system (MEMS) lens system 164 focusing device, such as with an adjustable MEMS polymer lens or aperture, to focus and improve the low resolution imaging of the CMOS imager 164 on the location of the user. In another embodiment, the range sensor data of range of user is provided to trigger the charge domain imaging device 162 when a user approaches or reaches at or within a second, closer detection range such that the charge domain imaging device 162 may begin facial recognition process of identify that a human user is before the information handling system 100 with focused low resolution imaging from the CMOS imager 164 and the charge domain AI module 166. The range sensor 172 may provide range data to the context engine module 170, such as to determine distance of a moving presence relative to the information handling system 100, whether the presence is moving towards the information handling system 100, whether the user is moving away from the information handling system 100. The range sensor may cover detecting presence in a wider space, such as a whole room, to confirm a presence when a user is near even when a light is off or the lid of an information handling system is closed. The charge domain imaging device 162 is then engaged to capture low resolution images at a closer detected distance range to determine whether the user is engaging with the information handling system 100 or gaze direction at one or more detection ranges, among others to conduct contextual functions by the charge domain imaging device 162 and with the low resolution CMOS imager 164 in embodiments herein. In some embodiments herein, the range sensor 172 supplements the charge domain imaging device 162 as described by dividing two detection ranges as well as controlling the low resolution image capture by the low resolution CMOS imager 164 with a MEMS lens system 165 for the low resolution CMOS imager 164 based on distance, or controlling a light illumination with a lighting level of an LED lighting unit for the low resolution CMOS imager 164 based on user distance and a detected dark room. In other embodiments, the range sensor 172 and the charge domain imaging device 162 cover the entire space, such as a room to provide redundancy such that the charge domain imaging device 162 senses the entire room or space, but confirms a presence is a human user or is engaging when close and which can be confirmed by the range sensor 172. Further, the range sensor 172 may still use detected range distance for controlling the low resolution image capture by the low resolution CMOS imager 164 with a MEMS lens system 165 for the low resolution CMOS imager 164 based on distance, or controlling a light illumination level for the low resolution CMOS imager 164 in such embodiments.

In an embodiment, the charge domain imaging device 162 integrates low resolution advanced sensing of the CMOS imager 164 onboard with embedded artificial intelligence (AI) processing with a design to specifically process the low resolution image data efficiently at the sensor level. An example of a charge domain imaging device 162 may include a Mantis V1® AI-in-sensor system on chip (SoC) manufactured by AISTORM®. In order to do this, the charge domain imaging device 162 may include a CMOS imager 164, a charge domain AI module 166 executing via a charge domain imaging device microprocessor 168.

During operation of the charge domain imaging device 162, the CMOS imager 164 may capture an image via photons converted into electrical charges at the individual photodiodes of the CMOS imager 164. In an example embodiment, the CMOS imager 164 may be a 96×96 low resolution imager. Unlike other imaging devices, instead of these electrical charges being converted into digital signals to be processed, the charge domain AI module 166 of the charge domain imaging device 162 may perform analog computations such as spatial filtering, edge detection, and pattern recognition directly on the generated charges from the sensor array before digitization occurs. The electrical charges from the photodiodes of the CMOS 164 are transferred to the charge domain AI module 166 of the charge domain imaging device microprocessor 168 via precise mechanisms like charge-coupled devices (CCDs) or capacitive charge-sharing circuits. This allows the charge domain AI module 166 to perform analog operations on these electrical charges more directly, with lower processing in between, thereby significantly reducing noise and power consumption compared to traditional digital imaging systems. In an embodiment, after initial charge-domain processing, the charge domain AI module 166 applies pre-trained models that are optimized for edge AI tasks, such as object detection, feature extraction, and motion tracking from the low resolution images captured to identify that a human user is in front of or engaged with the information handling system 100.

The output from the charge domain AI module 166 executed by and may be used by the charge domain imaging device microprocessor 168 to perform operations at the information handling system 100, such as a system wake, or at the charge domain imaging device 162 without the need to wake the information handling system 100 or use processing resources at the information handling system 100. In an embodiment, the charge domain imaging device microprocessor 168 may execute computer-readable program code instructions of the context engine module 170 to determine the context in which the information handling system 100 is operating and whether, based on the human detection and interaction operations of the range sensor 172 and the low resolution images capture and interpreted at the charge domain AI module, the information handling system 100 should be woken. For example, the CMOS imager 164 and charge domain AI module may detect gaze direction for a user from captured images for determination of user engagement before sending a wake signal. Range sensor 172 may determine distance or whether a user is retreating from or approaching the information handling system 100. Where the detected human is not interacting with the information handling system 100 via detection of eye movements, head placement, human distance from a video/graphics display device 150 of the information handling system 100, and the like, context engine module 170 of the charge domain imaging device 162 does not send a wake signal to the hardware processor 102 of the information handling system 100. Context engine module 170 and profiles for user engagement and interaction profiles and generated wake or input commands may be stored in a memory 167. Conversely, where human interaction is detected as approaching or within a second, closer detection range, the charge domain AI module 166 and charge domain imaging device microprocessor 168 may, in an example embodiment, engage in a facial recognition process that identifies facial features in captured images to determine a gaze direction of a detected user to identify an action from engagement as determined execution of a context engine module 170 stored in a memory 167 made accessible on the charge domain imaging device 162.

In an alternate embodiment, a higher resolution charge domain imager may be used as the low resolution CMOS imager 164. For example, higher than a 96×96 resolution imager such as a video graphics array (VGA) sensor may be used instead to conduct user authentication of a user from captured low resolution images by the charge domain imaging device 162 in one alternative embodiment without using wider information handling system 100 resources. Such an embodiment will also require increased sensor power for the charge domain imaging device 162, but will still be lower power than operation of digital cameras. This, again, reduces the amount of power consumption at the information handling system until it is determined that a user is present in front of the information handling system and interacting with the information handling system in embodiments herein without engaging wider resources of the information handling system 100.

It is also appreciated that the charge domain imaging device 162 may be granted access to a number of systems within the information handling system 100 even when the information handling system 100 is in a sleep state, but which may still be operating. Some of these systems may include a media playback software module that is currently or may provide audio output to those detected humans near the information handling system, an email software module used to notify those humans that new email has arrived via an audible notification, a notification software module to notify those humans of other notifications, voice identification/recognition and voice command software module, among other modules and subsystems.

Thus, during operation, the range sensor 172 and charge domain imaging device 162 may be always on and cooperate together to identify any number of humans around the information handling system 100, the distance of each human from the information handling system 100, whether those humans are interacting with the information handling system 100, and whether commands are being received from those users, among other tasks described herein. Additionally, because of the low power operation parameters of the range sensor 172 and charge domain imaging device 162, power may be conserved while no human is interacting with the information handling system 100. Indeed, the range sensor 172 may detect the retreat or approach of any human to determine if the human has passed into a first, further detection range or a second, closer detection range from the information handling system or not, and send a signal to the charge domain imaging device 162 to initialize capture of low resolution images at the charge domain imaging device 162 when the human has crossed into the second, closer detection range from the information handling system.

If the human has passed from the first detection range into a second, closer detection range from the information handling system, the range sensor 172 sends a wake command to the charge domain imaging device 162 and, together, the range sensor 172 and charge domain imaging device 162 may detect a specific location of each human, adjust a MEMS lens system 165 on a human, detect human interaction (e.g., gaze direction, facial features and expressions, eye movements, head placement, etc.), and determine if the information handling system 100 should be placed in a wake state. Where no human interaction is detected inside the second, closer detection range, the charge domain imaging device 162 with the charge domain imaging device microprocessor 168 may still access those subsystems and modules that allow a user, at a distance, to interact with the information handling system 100 by receiving voice input and receiving audible notifications from various software modules.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2A:
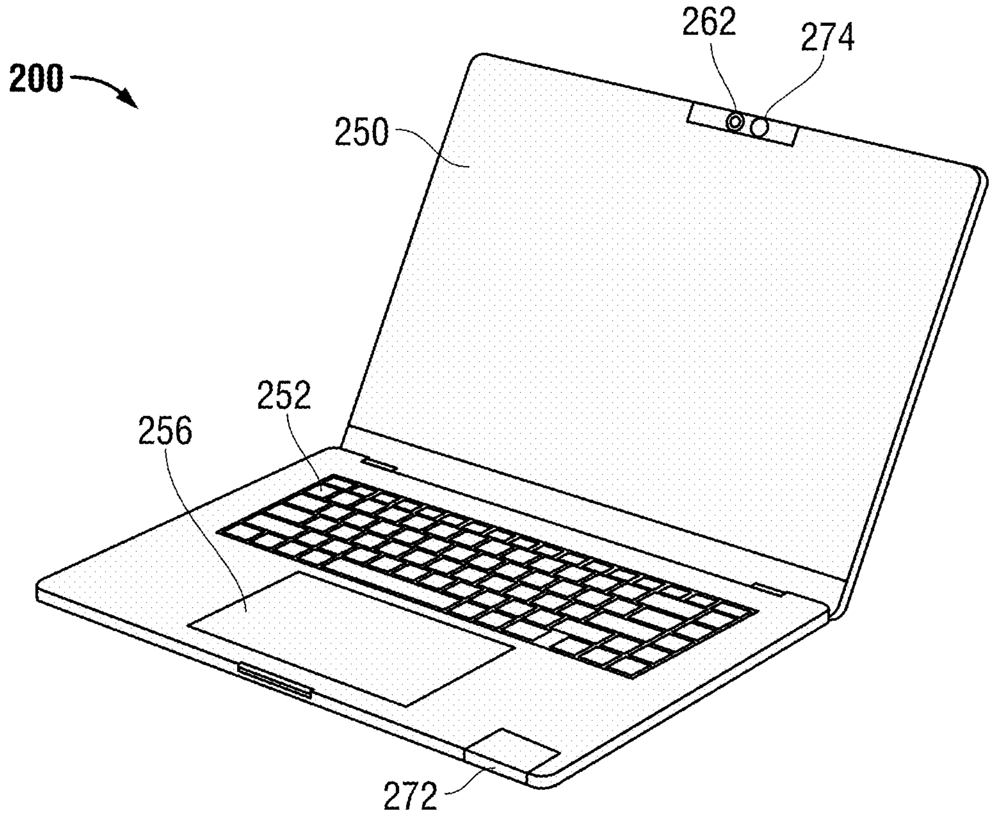
FIG. 2A is a graphic diagram illustrating an information handling system in an open orientation with a range sensor operating in tandem with a charge domain imaging sensor to detect user presence near the information handling system for plural engagement levels according to another embodiment of the present disclosure.
Figure 2B:
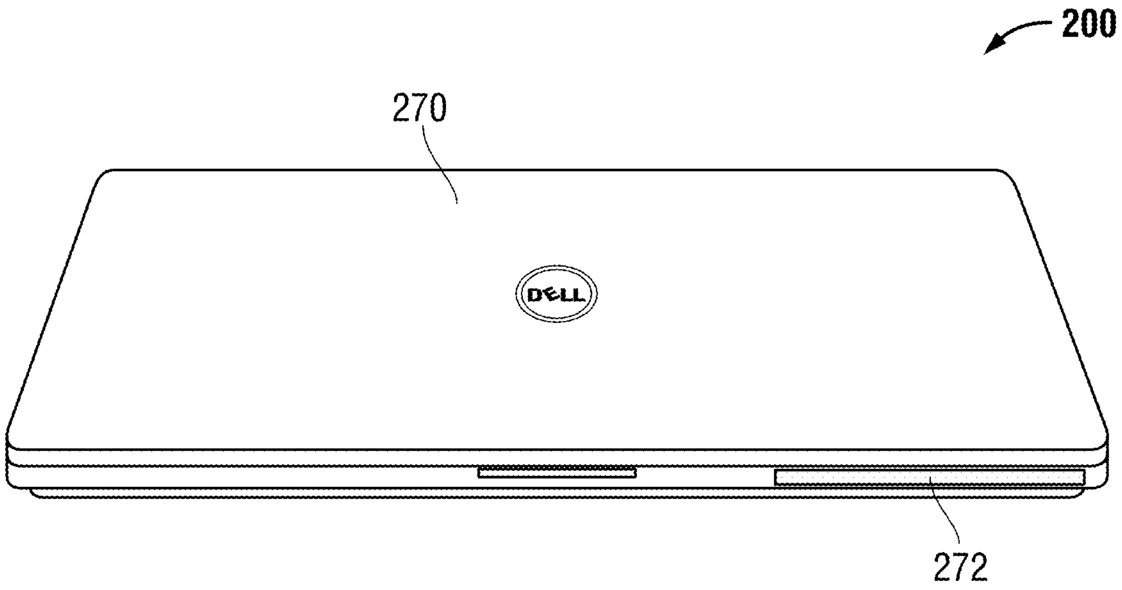
FIG. 2B is a graphic diagram illustrating an information handling system in a closed orientation used to detect user presence near the information handling system with a range sensor according to another embodiment of the present disclosure.

FIG. 2A is a graphic diagram illustrating an information handling system 200 in an open position used to detect user presence near the information handling system with plural low power sensors according to an embodiment of the present disclosure. Similarly, FIG. 2B is a graphic diagram illustrating an information handling system 200 in a closed position used to detect user presence near the information handling system with plural low power sensors according to another embodiment of the present disclosure. As described herein, the information handling system 200 may be a laptop-type of information handling system 200. In an embodiment, the information handling system 200 includes a lid portion that houses a video/graphics display device 250 and the charge domain imaging device 262. The information handling system 200 may also include a base portion that houses a keyboard 252 and a trackpad 256. Additionally, the base portion may house the range sensor 272 as described herein.

In an embodiment, the charge domain imaging device 262 may be placed at a top portion of the lid. In an embodiment, the charge domain imaging device 262 may be placed next to a webcam that is built into the housing of the information handling system 200. This allows the charge domain imaging device 262 to be positioned to catch images around the information handling system 200 at the same or similar viewpoint of a webcam. In an embodiment, a light 274 may be formed into the housing of the lid that provides illumination of a detected human when the charge domain imaging device 262 determines that illumination is necessary for improved operation. For example, the charge domain imaging device 262 may detect that the information handling system 200 is currently operating in a dark room such that the CMOS imager of the charge domain imaging device 262 cannot capture a sufficient image of the user in order to engage in facial recognition, for example. As such, the charge domain imaging device 262 may control the activation of the light 274 if and when illumination is necessary.

As shown in both FIGS. 2A and 2B, the range sensor 272 may be placed within the housing of a base portion of the information handling system 200. In this embodiment, an aperture of the range sensor 272 may be directed away from a lip of the base portion of the information handling system 200 such that the range sensor 272 may detect presence of a moving object generally presented in front of the information handling system 200. It is appreciated, however, that some technologies such as ultrasonic technologies may be incorporated into the range sensor 272 such that detection of presence movement and activity around the information handling system 200 may be detected in a 360° range around the information handling system 200.

Figure 3:
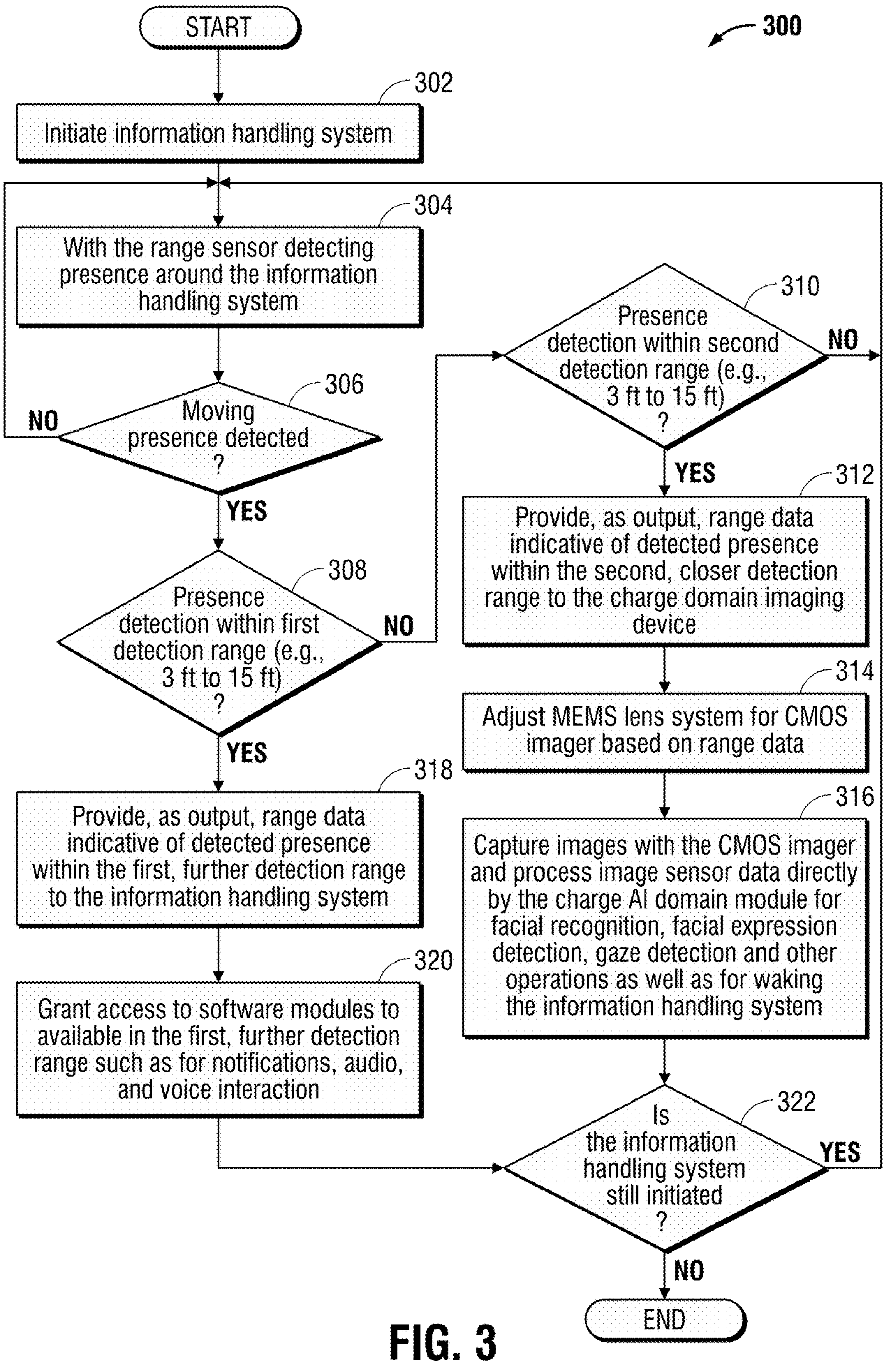
FIG. 3 is a flow diagram showing a method of executing a control system for an information handling system with a range sensor operating in tandem with a charge domain imaging sensor to detect user presence near the information handling system for plural engagement levels according to an embodiment of the present disclosure.

FIG. 3 is a flow diagram showing a method 300 of detecting human presence near the information handling system according to an embodiment of the present disclosure. As described herein, the information handling system may include both a range sensor and a charge domain imaging device used in tandem to detect human presence and provide access and interaction with the detected human use identified in front of or as engaged with an information handling system prior to waking an information handling system or using wider information handling system resources as described in embodiments herein. The method 300 may be implemented on a self-contained low power range sensor and a self-contained charge domain imaging device operating independently of an information handling system, such as when it is in a sleep mode, to interface with the information handling system in embodiments similar to those described in connection with FIGS. 1-2B.

At block 302, the information handling system may be initiated. This may include a user actuating a button that causes the PMU of the information handling system to provide power to the hardware processor and other hardware components of the information handling system. It is appreciated that after the user has initiated the information handling system, the user may walk away from the information handling system, return to interact with the information handling system, or otherwise disengage with the information handling system at some point. This may result in the information handling system 200 entering a sleep state such that access to the user interface of the information handling system is prevented. Whether the information handling system has been placed into this sleep state or not, the range sensor and charge domain imaging device are low power and always on to operate together to detect any presence within a first range and then moving presence near and human interaction with the information handling system within a second, closer range.

At block 304, the method 300 may include the range sensor detecting presence within and beyond a first detection range from the information handling system. In an embodiment, the range sensor may operate even while the information handling system is in a sleep state with the hardware processor of the information handling system in a low power state. This allows power to be conserved at the information handling system while the range sensor is monitoring for moving presence, such as for a human user or other objects, at and near the information handling system. In an embodiment, the range sensor may determine if a moving presence is within a first, further detection range of distances from the information handling system that is further than a second, closer detection range of distances. In an embodiment, this first detection range may be as far as fifteen feet, which may be similar to the size of a room where the information handling system has been placed. The range sensor may be a single pixel range sensor or a very simple range sensor such that lower power is consumed but detection of a user or any movement may be accurate and distance determination accurate, but which has limited or no resolution to image the user. The range sensor may be an ultrasound range sensor, a RADAR range sensor, an UWB range sensor, an IR TOF range sensor, or other type of range sensor in example embodiments.

Thus, at block 306, the range sensor may determine if any motion or presence is detected. It is appreciated that the range sensor may include a microcontroller that can identify whether a presence is detected and pass that output data onto the charge domain imaging device via an operative coupling that is a UART data transfer, GPIO data transfer, or other wired transfer within the information handling system or wireless data transfer as described herein. Where no presence is detected at block 306, the method 300 may return to block 304 for the range sensor to continue monitoring a space around the information handling system for a presence or motion. It may also be appreciated that, because the user may have retreated away previously from the information handling system, the range sensor may maintain this data and continue waiting for the user presence or any presence returns such that the range sensor can detect that presence. Where, at block 306, a presence or motion is detected, the method 300 may continue to block 308.

At block 308, the range sensor may determine if the detected presence is within a first detection range to the information handling system. As described herein, this first detection range may be between three feet and fifteen feet in one embodiment. The outer bound of the first detection range may be similar to the size of a room where the information handling system has been placed and which does not include a second detection range that may correspond to an operational range for CMOS imaging of the charge domain imaging device (e.g., about three feet). However, the range detector can still detect a presence such as that of a user with distance or location, within the second detection range as discussed below. Where, at block 308, no presence is detected within the first, further detection range, the method may proceed to block 310. Where, at block 308, a presence is detected within the first, further detection range, the method may proceed to block 318.

At block 318, the presence is located within the first, further detection range, for example 3 to 15 feet. In an embodiment, the presence, such as of a user, in the first detection range may be reported to the charge domain imaging device executing machine readable code instructions of a context engine to provide for context-based operations available to a user that is the presence within the first detection range, but not close enough for low resolution imaging interaction with the charge domain imaging device via the CMOS imager thereon.

The method proceeds to block 320, where the charge domain imaging device microprocessor executes machine readable code instructions of a context engine module to provide for context-based operations available to a user that is the presence within the first detection range such as granting limited access to various software modules operating on the information handling system, although in a sleep state, for example. This access grant may be based on the detection of the user in the first, further detection range by the range sensor. In some embodiments, authorization such as voice recognition may be required for access. Example software modules operating on the information handling system, although in a sleep state, may include for notification, audio, and voice interaction. As described herein, the range sensor may cause that certain voice commands may be received by the information handling system by a user who is standing away from the information handling system. For example, a voice recognition software module may monitor for a user's voice after presence is detected in the first, further detection range that may wake the system or operate to adjust volume of streaming music or respond to notifications or communications in embodiments herein. Additionally, certain audio may be output by the information handling system which, based on the distance of the human away from the information handling system may need to have the volume increased so that the human can hear the audio in some embodiments. Even further, certain notifications such as new email or messaging notifications may be provided such that the human may be so notified of receipt of the email when in the first, further detection range in an embodiment. The method 300 may then continue to block 322 to determine if the information handling system is still initiated or has been powered down.

Returning to block 308, where no presence is detected within the first, further detection range, the range sensor may determine if that a presence is detected is within a second, closer detection range that includes the range from the information handling system to three feet from the information handling system. Again, this second, closer detection range is an effective detection range of the CMOS imager of the charge domain imaging device. The range sensor may determine that a human or other presence is approaching the second, closer detection range from the first, further detection range in some embodiments herein. Such data may be reported to the charge domain imaging device in various embodiments herein. Where no presence is detected within the second detection range, the method 300 returns to block 304 as a result of no presence being detected within the first or second detection ranges for continued monitoring. However, where a presence is detected within the second detection range at block 310, the method 300 continues to block 312.

At block 312, the method 300 includes providing range data output to the charge domain imaging device to trigger activation of the CMOS imager prompted by the detected presence within the second, closer detection range to the information handling system and the charge domain imaging device. As described herein, the output data signal for the range distance from the range sensor may include a waking signal or may trigger a waking signal at the charge domain imaging device that wakes the CMOS imager of the charge domain imaging device thereby conserving power by allowing the CMOS imager to remain in a sleep state until needed. In some embodiments, the charge domain imaging device operate in an always on state, but the waking signal engages the CMOS imager to capture images and provide those to the charge domain AI module for direct processing from the imaging sensors.

Proceeding to block 314, the range data provided may be used to tune the distance or a direction of a user from the CMOS imager at the charge domain imaging device. For example, the CMOS imager may have a tunable MEMS lens system that may adjust the focus of the CMOS imager based on the distance detected and reported by the range sensor. The range sensor has precise distance range detection that may be used by the charge domain imaging device to provide adjustment commands in real time to the MEMS lens system to adjust the focus. In further embodiments, a light may be triggered at the information handling system if the CMOS imager or a light sensor detects a low lighting condition. However, this light may consume power, so its activation or brightness level may be set, in part, based on the distance data detected and reported by the range detector of the user within the second, closer detection range in an embodiment.

At block 316, the method 300 includes capturing images of a user with the CMOS imager and passing those, via a charge coupled device or other direct sensor access system, to the charge domain AI module executing as machine readable code instructions on the charge domain imaging device microprocessor. The charge domain AI module processes the CMOS imager data from each of the sensors in the array of CMOS image sensors onboard the charge domain imaging device for facial recognition, facial expression detection, user authentication, gaze direction detection among other processes described herein. Again, this allows the charge domain imaging device to operate certain functions for the information handling system before having to provide a wake signal to the hardware processor of the information handling system thereby allowing the information handling system to stay in a sleep state and conserving power.

For example, the charge domain AI module processes the CMOS imager data of a captured image to recognize that a human face is before the information handling system in an embodiment, In another embodiment, the charge domain AI module processes the CMOS imager data of an image of a user for facial feature recognition to determine gaze direction, for example, from the low-resolution image without engaging wider information handling system resources for engagement inputs to be received from the user, such as engagement itself triggering a wake command. In yet another embodiment, the charge domain AI module processes the CMOS imager data to determine a gaze direction to determine if the user is engaging with the information handling system to provide for when to activate a software module at a particular screen, interactions or gestured with executing software on the information handling system, even after the information handling system is awake. It is appreciated that in embodiments herein, the charge domain AI module processes the CMOS imager data before waking the information handling system for some contextual operations, such as waking the information handling system, as well as after the information handling system has been woken such as for gaze detection one or more contextual IO command inputs to access functions for the information handling system without using wider information handling system resources. At this point, the method 300 may continue to block 322.

At block 322, the method 300 may include determining if the information handling system is still initiated. Where the information handling system is still initiated, the method 300 proceeds to block 304 to continue with detecting moving presence around the information handling system. Then the method 300 may proceed according to embodiments described herein. Where the information handling system is no longer initiated, the method 300 may end.

The blocks of the flow diagrams of FIG. 3 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system including a range sensor and a charge domain imaging device operating in tandem to detect human presence near the information handling system comprising:

a hardware processor, a data storage device, and a power management unit (PMU) to provide power to the hardware processor and data storage device;

the range sensor to detect a moving presence within a first detection range from the information handling system and provide that first detection range data to a charge domain imaging device for access to software modules of the information handling available to a user within the first detection range;

a range sensor to detect the moving presence within a second detection range closer than the first detection range from the information handling system and provide that second detection range data to the charge domain imaging device to trigger a low-resolution imager at the charge domain imaging device to capture low resolution images of the user within the second detection range; and a charge domain imaging device microprocessor to process sensor data of the captured low resolution images from an array of image sensors of the low-resolution imager with execution of machine readable code instructions of a charge domain artificial intelligence module onboard the charge domain imaging device to engage in facial recognition from the captured low resolution image to identify that the user is before the information handling system.

2. The information handling system of claim 1 further comprising:

the charge domain imaging device formed into a top portion of a lid of the information handling system; and the range sensor formed on base chassis of the information handling system.

3. The information handling system of claim 1 further comprising:

the charge domain imaging device to process the sensor data of the captured low resolution images from the array of image sensors of the low-resolution imager to determine facial features of the user indicating a user is engaged with the information handling system and sending a wake command to the information handling system.

4. The information handling system of claim 1 further comprising:

the charge domain imaging device to process the sensor data of the captured low resolution images from the array of image sensors of the low-resolution imager to determine facial features of the user indicating a user is engaged with the information handling system and sending a gaze direction command to the information handling system.

5. The information handling system of claim 1 further comprising:

the range sensor to determine if the user is retreating from the information handling system and providing output indicating to the information handling system of a distance of the user from the information handling system.

6. The information handling system of claim 1 further comprising:

the charge domain imaging device including charge domain imaging device microprocessor to execute computer-readable program code of a context engine module to, based on detected user interaction, provide output to the information handling system indicative of operations to be performed.

7. The information handling system of claim 1 further comprising:

the range sensor to detect moving presence within the first detection range from the information handling system and provide that first detection range data to the charge domain imaging device to access a voice identification process for interfacing with the user.

8. The information handling system of claim 1 further comprising:

the range sensor to detect moving presence within the first detection range from the information handling system and provide that first detection range data to the charge domain imaging device to access audible notifications from the information handling system at an audible volume within the first detection range.

9. A method to detect human presence near an information handling system a range sensor and a charge domain imaging device operating in tandem comprising:

detecting, with the range sensor formed on a base chassis of the information handling system, a moving presence is within a first detection range from the information handling system and provide that first detection range data to a charge domain imaging device formed into a top portion of a lid of the information handling system for access to software modules of the information handling available to a user within the first detection range;

detecting, with the range sensor, the moving presence within a second detection range closer than the first detection range from the information handling system and provide that second detection range data to the charge domain imaging device to trigger a low-resolution imager at the charge domain imaging device to capture low resolution images of the user within the second detection range, where the second detection range corresponds to an operational range of the low-resolution imager from the information handling system; and processing, with a charge domain imaging device microprocessor, sensor data of the captured low resolution images from an array of image sensors with execution of machine readable code instructions of a charge domain artificial intelligence module onboard the charge domain imaging device to engage in facial recognition from the captured low resolution image.

10. The method of claim 9 further comprising:

processing the sensor data of the captured low resolution images of the user from the array of image sensors to determine facial features of the user indicating a user is engaged with the information handling system and sending a wake command to the information handling system.

11. The method of claim 9 further comprising:

processing the sensor data of the captured low resolution images of the user from the array of image sensors with a facial recognition algorithm to identify a face before the charge domain imaging device prior to sending a wake command to the information handling system.

12. The method of claim 9 further comprising:

processing the sensor data of the captured low resolution images of the user from the array of image sensors to determine facial features of the user indicating a user gaze direction for engagement interaction with software applications executing on the information handling system.

13. The method of claim 9 further comprising:

to receive distance data indicating the distance of the user from the range sensor at the charge domain imaging device; and adjusting a lens adjustment system of the low-resolution imager to focus on the user in the second detection range at the distance of the user.

14. An information handling system operating in a sleep state having plural sensors to detect human presence near the information handling system comprising:

a hardware processor, a data storage device, and a power management unit (PMU) to provide power to the hardware processor and data storage device;

a range sensor to detect a moving presence within a first detection range from the information handling system and provide that first detection range data to a charge domain imaging device for access to software modules of the information handling available to a user within the first detection range;

the range sensor to detect the moving presence within a second detection range closer than the first detection range from the information handling system and provide that second detection range data to the charge domain imaging device to trigger a complimentary metal-oxide semiconductor (CMOS) imager at the charge domain imaging device to capture low resolution images of the user within the second detection range;

a charge domain imaging device microprocessor to process sensor data of the captured low resolution images from an array of image sensors of the CMOS imager with execution of machine readable code instructions of a charge domain artificial intelligence module onboard the charge domain imaging device to engage in facial recognition from the captured low resolution image to identify presence of the user in front of the information handling system.

15. The information handling system of claim 14 further comprising:

the charge domain imaging device formed into a top portion of a lid of the information handling system; and the range sensor formed on a base chassis of the information handling system.

16. The information handling system of claim 14 further comprising:

the charge domain imaging device to process the sensor data of the captured low resolution images from the array of image sensors of the CMOS imager to determine facial features of the user indicating a user is engaged with the information handling system and sending a gaze direction command to the information handling system.

17. The information handling system of claim 14 further comprising:

the charge domain imaging device to process the sensor data of the captured low resolution images from the array of image sensors of the CMOS imager to execute facial recognition to identify a face before the charge domain imaging device and sending a wake command to the information handling system.

18. The information handling system of claim 14 further comprising:

the charge domain imaging device to receive distance data indicating the distance of the user from the range sensor and adjusting a lens adjustment system of the low-resolution imager to focus on the user in the second detection range at the distance of the user from the range sensor, where the lens adjustment system is a microelectromechanical system (MEMS) including an adjustable polymer lens.

19. The information handling system of claim 14 further comprising:

the charge domain imaging device microprocessor to execute computer-readable program code of a context engine module to, based on detected user interaction detected with the captured low resolution images, provide output to the information handling system indicative of operations to be performed.

20. The information handling system of claim 14 wherein the CMOS imager resolution is less than 300×300 pixels corresponding to the array of image sensors of the CMOS imager which are provided to the charge domain artificial intelligence module for processing of the images sensor array data.

* * * * *